(12) United States Patent
Martin et al.

(10) Patent No.: US 7,974,576 B2
(45) Date of Patent: Jul. 5, 2011

(54) COMBINED OPEN AND CLOSED LOOP POWER CONTROL IN A COMMUNICATIONS SATELLITE

(75) Inventors: Timothy J. Martin, Carlsbad, CA (US); John Hai O'Neill, Carlsbad, CA (US); Anthony Guy Hamel, Encinitas, CA (US); Mark J. Miller, Vista, CA (US)

(73) Assignee: ViaSat, Inc., Carlsbad, CA (US)

( * ) Notice: Subject to any disclaimer, the term of this patent is extended or adjusted under 35 U.S.C. 154(b) by 632 days.

(21) Appl. No.: 12/027,887

(22) Filed: Feb. 7, 2008

(65) Prior Publication Data

US 2008/0194199 A1 Aug. 14, 2008

Related U.S. Application Data

(60) Provisional application No. 60/889,017, filed on Feb. 9, 2007.

(51) Int. Cl.
*H04B 7/185* (2006.01)
(52) U.S. Cl. ........... 455/13.4; 455/522; 455/69; 455/70; 455/12.1; 455/11.1; 370/315
(58) Field of Classification Search .................. 455/522, 455/69–70, 10, 12.1, 13.1, 13.4, 9; 370/315–318
See application file for complete search history.

(56) References Cited

U.S. PATENT DOCUMENTS

| | | | |
|---|---|---|---|
| 4,941,199 A | 7/1990 | Saam | |
| 6,335,920 B1 | 1/2002 | Strodtbeck et al. | |
| 7,110,717 B2 | 9/2006 | Miller et al. | |
| 7,295,855 B1* | 11/2007 | Larsson et al. | 455/522 |
| 2001/0010686 A1* | 8/2001 | Kubo et al. | 370/335 |
| 2002/0137457 A1 | 9/2002 | Nivens et al. | |
| 2003/0040274 A1 | 2/2003 | Dai et al. | |
| 2005/0213636 A1* | 9/2005 | Zeira et al. | 375/130 |
| 2006/0035660 A1* | 2/2006 | Anderson | 455/522 |
| 2006/0128410 A1* | 6/2006 | Derryberry et al. | 455/509 |
| 2006/0203921 A1* | 9/2006 | Wang et al. | 375/242 |

FOREIGN PATENT DOCUMENTS

WO  WO 98/45962 A1  10/1998

OTHER PUBLICATIONS

SAAM, "Uplink Power Control Technique for VSAT Networks," *IEEE Proceedings-1989 Southeastcon*, May 1989, CH-2674-5/89/0000-0096.
Atia, "Ka-Band Satellite System Architecture For Local Loop Internet Access," Microwave Symposium Digest, 2001 IEEE MTT-S Digest, International, Phoenix, AZ, (2001) vol. 2, pp. 1133-1136.

(Continued)

*Primary Examiner* — Edward Urban
*Assistant Examiner* — Fayyaz Alam
(74) *Attorney, Agent, or Firm* — Kilpatrick Townsend & Stockton LLP; Kenneth R. Allen

(57) ABSTRACT

In a telecommunication network where a wireless path is provided between a transmitter and a receiver via a satellite relay forming a multi-hop relayed signal path, a method and system are provided for furnishing adequate signal at a user terminal, which may be in motion, along the propagation path, the method including an open loop component that uses measurements of fading in a received signal at a first terminal to adjust transmit power from the first terminal and further includes a closed loop component that uses measurements of fading in the received signal at a second terminal along with an acknowledgement message and power correction.

7 Claims, 8 Drawing Sheets

OTHER PUBLICATIONS

Atia, et al., "Ka-Band Satellite System Architecture For Local Loop Internet Access," Fifth Ka Band Utilization Conference: Oct. 18-20, 1999, Taormina, Italy, (2000) Genova: Instituto Internationale Delle Comunicazioni.

International Search Report PCT/US05/20354.

The International Preliminary Report on Patentability from International Application No. PCT/US2008/053550 dated Aug. 20, 2009. 8 pages.

International Search Report PCT/US2008/05350 dated Aug. 25, 2008.

* cited by examiner

COMBINED OPEN AND CLOSED LOOP POWER CONTROL IN A COMMUNICATIONS SATELLITE

CROSS-REFERENCES TO RELATED APPLICATIONS

The present application claims benefit under 35 USC §119 (e) of U.S. provisional Application No. 60/889,017, filed on Feb. 9, 2007, entitled "Combined Open And Closed Loop Power Control," the content of which is incorporated herein by reference in its entirety.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

This invention relates to wireless communication via a satellite relay and more particularly to regulation of signal power in a wireless network using a satellite relay.

In a communication environment, power control is a process by which power level or EIRP of transmissions is adjusted in the presence of varying propagation conditions in order that signals arrive at an intended receiver at a signal level sufficient for accurate reception. Various impediments in a transmission path can cause poor propagation and even loss of signal, including weather, interference, signal reflection, signal blockage, multi-path, and the like. In an environment where a celestial relay station is used, in particular via an orbiting satellite which is subject to severe power budget restrictions, simply adding power is neither possible nor desirable. A source of background information on the problem and a partial proposed solution based on monitoring a beacon reference is described in T.J. Saam, "Uplink Power Control Technique for VSAT Networks," *IEEE Proceedings-1989Southeastcon*, May 1989, CH-2674-5/89/0000-0096. U.S. Pat. No. 7,110,717 entitled "Leader-Follower Power Control" in the names of two of the present co-inventors and commonly assigned to Viasat of Carlsbad, Calif., provides a further perspective on the problem. Notably, prior approaches did not take into account both short-term and long-term degradation factors along propagation paths. The problem of assuring adequate power to the user terminal at the point of reception is further complicated if the terrestrial terminal is in motion, such as on a motor vehicle or an aircraft.

What is needed is a power control system and technique to mitigate signal impediments in a wide range of circumstances and thus improve communication reliability without requiring the application of unnecessary power.

SUMMARY OF THE INVENTION

According to the invention, in a telecommunication network where a wireless path is provided between a transmitter and a receiver via a satellite relay forming a multi-hop relayed signal path, a method and system are provided for furnishing adequate signal at a user terminal, which may be in motion, along the propagation path, the method including an open loop component that uses measurements of fading in a received signal at a first terminal to adjust transmit power from the first terminal and further includes a closed loop component that uses measurements of fading in the received signal at a second terminal along with an acknowledgement message and power correction. A speed estimation is employed in the open loop correction control signal path to modulate relatively long-term effects associated with terminal ground speed, along with more rapid closed loop power control.

The invention will be better understood by reference to the following detailed description in connection with the accompanying documents.

DETAILED DESCRIPTION OF THE INVENTION

Figure 1:
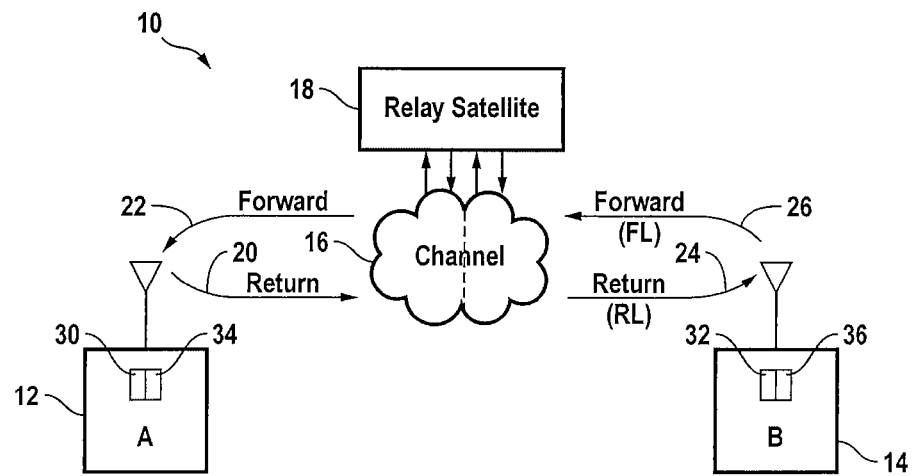
FIG. 1 is a block diagram of a system in which the invention is implemented.

FIG. 1 illustrates a system 10 in an environment in which the invention is implemented. Two terminals A 12 and B 14, at least one of which may be in motion from time to time, are coupled in communication via a communication cloud 16 with a relay for example through a communication satellite 18. The terminals A 12 and B 14 communicate bi-directionally over a bi-directional communication channel of segments 20, 22, 24, 26 as hereinafter explained and that may be subject to degradation, such as short term and long term fading and other propagation effects, including transient interference. The transmission direction from Terminal B to Terminal A is called the forward link (FL) direction and is composed of segments 26 and 22, and the transmission direction from Terminal A 12 to Terminal B 14 is called the return link (RL) direction and is composed of segments 20 and 24. More specifically, the forward link (FL) direction comprises an uplink segment (FUL) 26 and a downlink segment (FDL) 22. The return link (RL) comprises an uplink segment (RUL) 20 and a return downlink segment (RDL) 24. The purpose of the invention is to control the power level on the return uplink segment (RUL) 20, particularly where Terminal A 12 is in motion. The forward channel (FL) 22, 26 and return channel (RL) 20, 24 are not necessarily equivalent in their characteristics, although the long-term characteristics of the two channels are generally correlated, and the short term characteristics are not necessarily correlated. Embedded in each terminal 12 and 14 are an open loop sensor/controller 30, 32 and a closed loop controller 34, 36. As hereinafter explained, these controllers may be integrated into a single processor.

Figure 2:
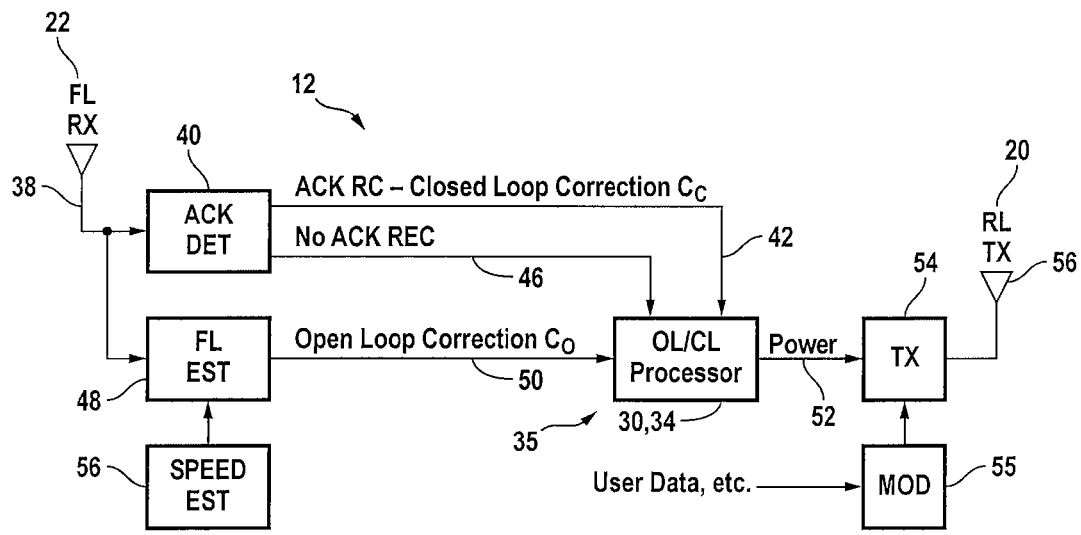
FIG. 2 is a block diagram of a subset of the equipment in user terminal A.

FIG. 2 is a block diagram of a subset of the equipment in user terminal A 12. The received forward link (FL) 22 signal receives at the terminal 12 a signal on signal line 38, which is processed for an acknowledgement at an acknowledgement (ACK) detector 40. The ACK detector 40 operates on decoded data and, upon receipt of an acknowledgement (as herein below explained), supplies a closed loop correction factor $C_c$ via path 42 to a combined open loop/closed loop power control processor 30, 34. If no acknowledgement is received when expected at the acknowledgement detector 40, this information is passed as a no-acknowledgement received (No ACK REC) signal via path 46 to the combined open loop/closed loop power control processor 30, 34 (also called simply the power control processor 35).

The received FL signal 22 is also processed by a forward link metric estimator (FL EST) 48 to create an open loop correction factor $C_o$ in a path 50 to the power control processor 35. Representative embodiments for the forward link metric are signal power, signal amplitude, and/or signal $E_b/N_0$. To help explain the subject invention in terms of example embodiments, only signal power and signal to noise ratio $E_b/N_0$ are discussed further below. The representative output of the power control processor 35 is a power control signal 52 applied to a transmitter stage 54, which in turn serves as a power amplifier for the output of a modulator 55 that itself is fed with user data and the like. The controlled r.f. output of the transmitter stage 54 is supplied to an appropriate antenna 56 that directs its signal on the return uplink 20 to the relay satellite 18 through the communication cloud 16.

Figure 11:
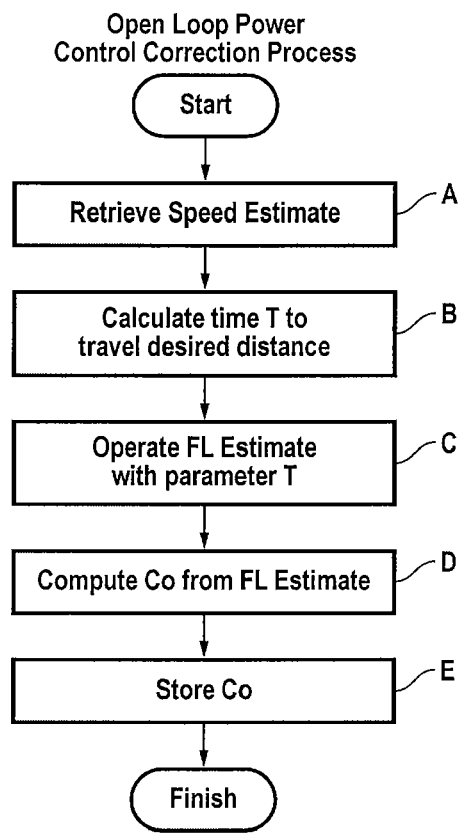
FIG. 11 is a flow diagram of a first embodiment of an open loop process according to the invention.

In one embodiment of the subject invention, and referring to FIG. 2 and FIG. 11 showing a first open loop embodiment flow diagram, a representative terminal, e.g., terminal A 12, is contemplated to be in motion, and the speed of terminal A 12, as estimated from input from a speed estimator 56 (Step A) is used to calculate the time T to travel the desired distance (Step B) to determine how long the forward link estimator 48 is to observe the received signal before determining the estimated level of the signal and thus to determine the metric to be used for open loop correction. It operates the forward link FL estimate with the parameter T (Step C) and computes the open loop correction Co (Step D) that is then stored for use in the processor 30, 34 (Step E). This estimate, which may be a local manual input or an input from a GPS receiver unit, for example, allows the estimator 48 to operate on an "amount-of-distance-traveled" basis, which is useful if terminal A 12 is in motion.

Figure 12:
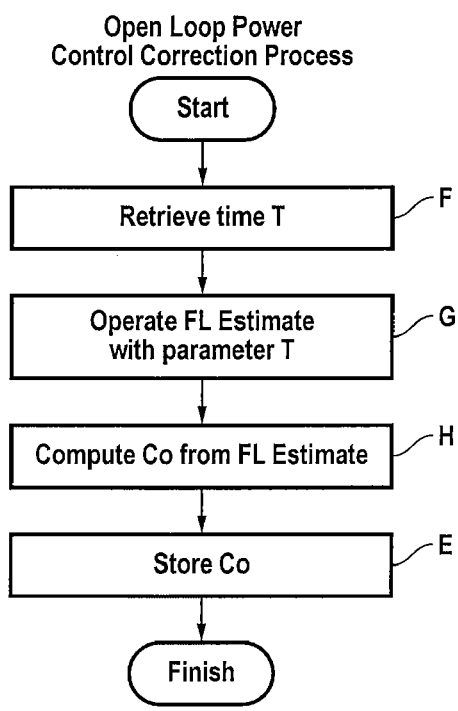
FIG. 12 is a flow diagram of a second embodiment of an open loop process according to the invention.

In another embodiment of the subject invention, and referring to FIG. 12 showing a second open loop embodiment flow diagram, the estimator 48 retrieves the time T (Step F) and itself observes the received signal 22 for a specified amount of time before determining the estimated level of the signal (Step G) to determine the metric to be used for the open loop correction (Step H) that is then stored for use in the processor 30, 34 (Step E). This allows the estimator 48 to operate on an "amount-of-time-passed" basis, which is useful if terminal B 14 is in motion with its speed unknown at terminal A 12.

Figure 13:
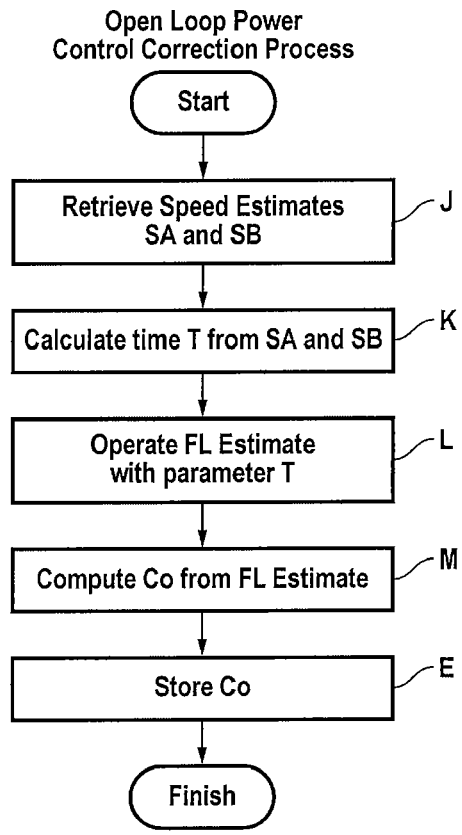
FIG. 13 is a flow diagram of a third embodiment of an open loop process according to the invention.

In yet a third embodiment of the subject invention, and referring to FIG. 13 showing a third open loop embodiment flow diagram, the speeds of both terminal A 12 and terminal B 14 are measured locally (Step J) and used to determine how long the estimator (e.g., 48) observes the received signal (Step K) before determining the estimated level of the signal (Step L) to determine the metric to be used for open loop correction (Step M) that is then stored for use in the processor 30, 34 (Step E).

Figure 14:
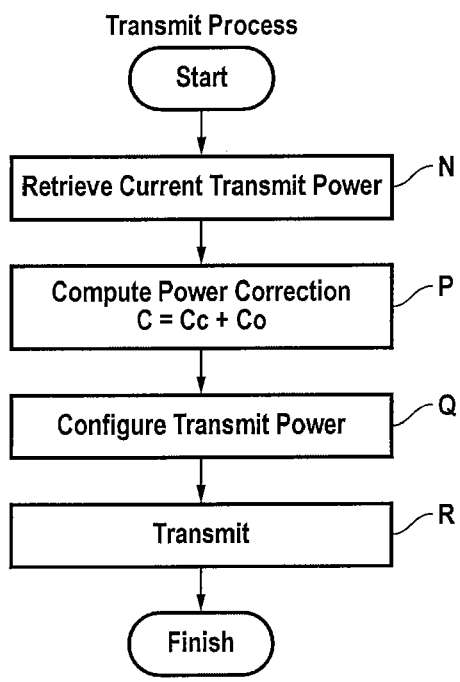
FIG. 14 is a flow diagram of a first embodiment of a combined transmit process according to the invention.

According to the invention, the open loop and closed loop corrections $C_o$ and $C_c$, which are related to differing rates of change are used in combination as hereinafter explained to generate the return link transmit power level adjustment 52 that controls the power of the transmitter TX 54 which conveys the modulated data over the communication link RL 20 to the second terminal B 14 (FIG. 1). The combining can be implemented in numerous forms. In one embodiment, and referring to FIG. 14 showing a flow diagram of first transmit process with a first combining process, the current transmit power is retrieved (Step N) and the total power correction C is computed (Step P) by adding the open loop correction $C_o$ to the closed loop correction $C_c$. The transmit power is then configured (Step Q) and the transmission is effected (Step R).

Figure 15:
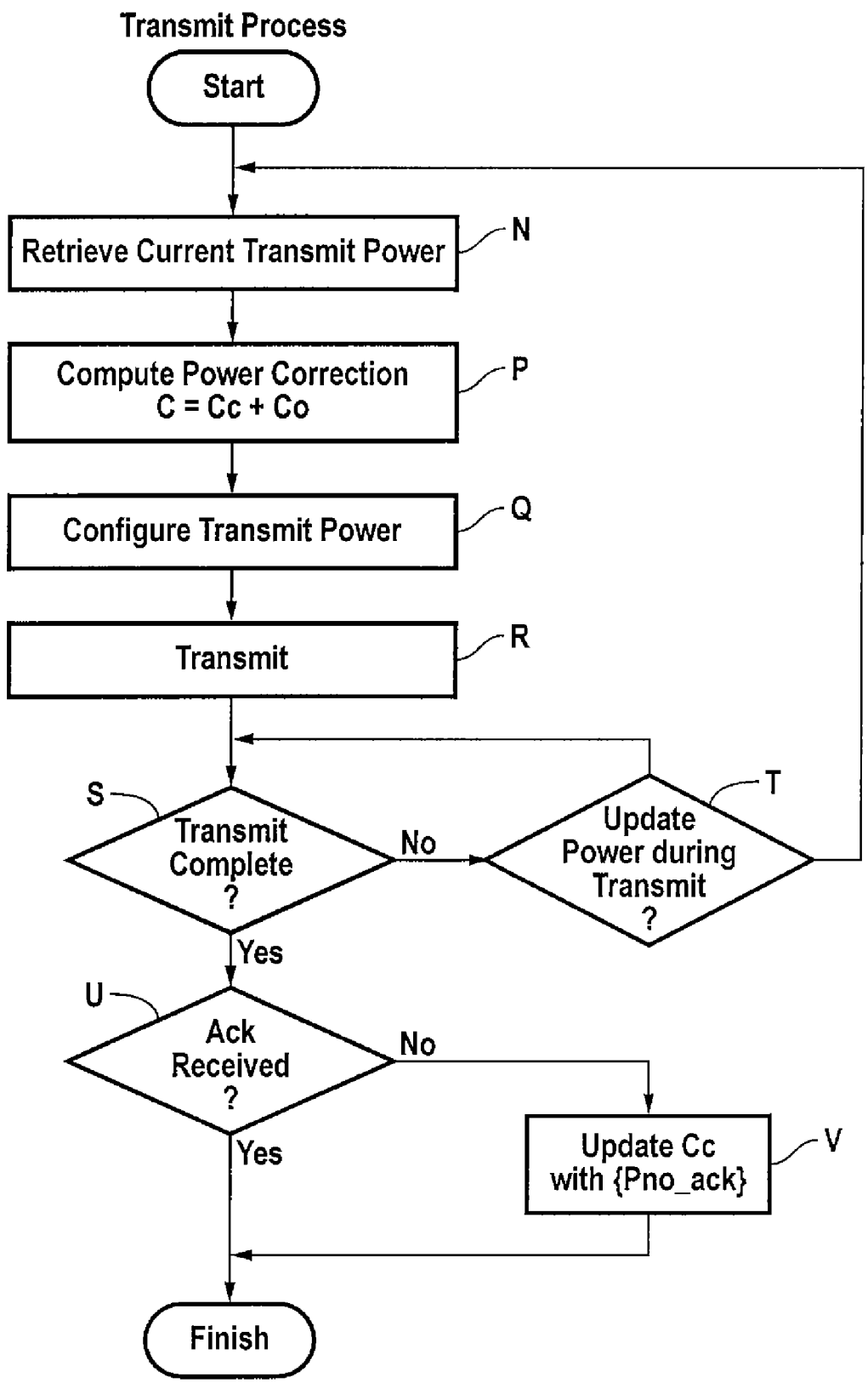
FIG. 15 is a flow diagram of a second embodiment of a combined transmit process according to the invention.

In another embodiment and referring to FIG. 15 showing a second transmit process, the transmission is tested for completeness (Step S) after transmission (Step R as before) and power is updated during transmission (Step T). If transmission is complete, and until receipt is acknowledged (Step U), the open loop correction $C_o$ is added to a set of pre-determined values {Pno_ack} (Step V), which would be used in case an expected ACK is not received (presumably because the previous transmit power level was too low). This operation may occur in both an initial communication phase (such as terminal log-in to a network) or during steady state communication.

Figure 16:
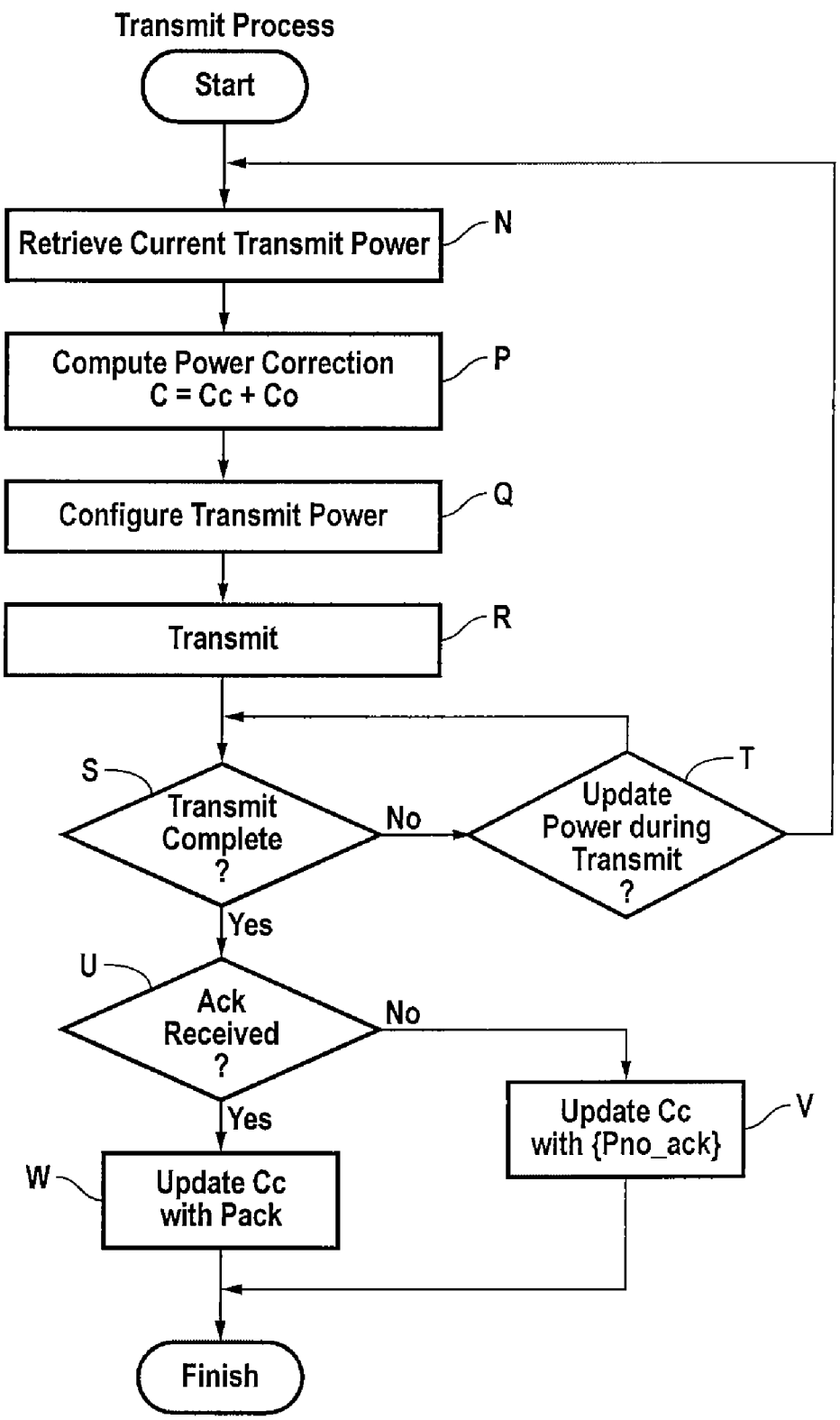
FIG. 16 is a flow diagram of a third embodiment of a combined transmit process according to the invention.

In a third embodiment and referring to FIG. 16 showing a third transmission process, a combination of the first two embodiments is implemented. For example, a state machine may alternate between ACK and NO-ACK states with appropriate operations in each state, in the NO-ACK state being the correction factor update (Step V previously), and in the ACK state being to update the power correction with the power of the ACK, i.e., Pack (Step W).

Figure 3:
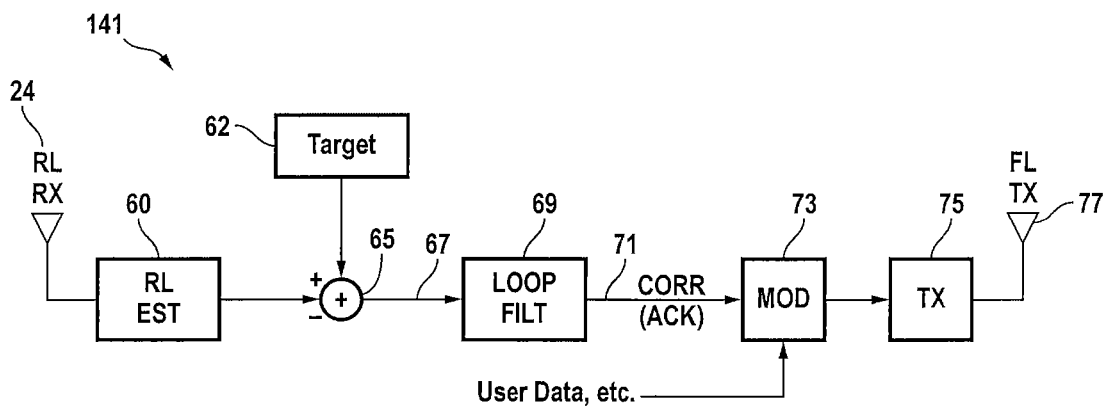
FIG. 3 is a partial block diagram of a specific embodiment of terminal B.

FIG. 3 is a block diagram of a subset 141 of the equipment in terminal B 14. Herein, the received Return Link RL 24 signal is the signal to which the power control has been applied. The received RL 24 signal is thus received subject to the degradation of the channel 24. A return link (RL) estimator 60 at the front end is provided to calculate one or more metrics of the received RL 24 for comparison in an appropriate comparator system 64 with output of an $E_b/N_0$ target 62. A component that supplies the target value. The error signal on path 67 is supplied through a loop filter 69 as a correction and/or acknowledgement (ACK) on path 71 to a modulator 73 that is configured to use user data and the like to modulate a transmitter TX 75, which in turn excites the antenna 77 with the forward link signal FL.

Some example embodiments of a return link metric are the signal amplitude $E_b$ and the signal-to-noise ratio $E_b/N_0$. For a signal amplitude metric, a Leader-Follower Power Control technique, such as that disclosed in U.S. Pat. No. 7,110,717, may be used. This technique requires a "Leader" terminal, which may be undesirable in some situations (because costs to configure and maintain the leader terminal are required, thereby reducing system capacity and imposing other overhead burdens).

For a return link signal $E_b/N_0$ metric, the challenge is to estimate noise $N_0$. In a multiple access environment, prior techniques used to estimate $E_b/N_0$ first measure $E_b/(N_0+I_0)$ and then attempt to remove the $I_0$ term. This can be computationally difficult and may be prone to excessive and unacceptable estimation error. However, in an embodiment of the present invention, the $E_b/N_0$ metric on return link signal is performed by introducing periodic return link transmission outages during which no terminals are transmitting on the return link 24. (For example, if the return link 24 is shared by other terminals, then they would all temporarily cease transmission.) The $N_0$ estimator portion of the return Link estimator 60 monitors the return link 24 channel in these dwell times. Because the $N_0$ parameter generally varies very slowly (typically primarily due to the diurnal effect of the system heating in the day and cooling at night), the transmission outages would be very short (for example 1 second per hour). During the non-outage periods, the terminals' 12, 14, etc. transmit signal of amplitude $E_b$ would be estimated. The $E_b/N_0$ target 62 is then a fixed constant (dependent on per terminal QoS, for example) and since absolute $E_b/N_0$ estimates are obtained, a leader terminal is not required.

Implementation Example In order to place the subject invention into a context so that it can be appreciated, an example is presented. In the example, the following assumptions are made:

1. Hub/Spoke system (Terminal B 14 is a hub, multiple terminals A 12 are the spokes).
2. Return link modulation is spread GMSK.
3. Forward link modulation is QPSK with symbol rate 166 ksps.
4. The channels are a land mobile S-band satellite channel with fixed terminals, land mobile terminals and helicopter terminals.
5. The Return link experiences a relatively high frame error rate (up to 25%).

The power control algorithm according to the invention includes an open loop component and a closed loop component. The open loop component uses measurements of the forward link channel power measured by the terminal to offset the terminal transmit power. The closed loop component uses measurements of the return $E_b/N_0$ and a link-layer acknowledgement and power correction protocol.

The return channel characteristics depend on the terminal platform dynamics. Three channel models are considered:
Static Terminal—AWGN channel
Land Mobile Terminal—Rician channel with lognormal shadowing
Helicopter Terminal—Essentially a Rician channel with periodic blockage/distortion due to rotor blades The Land Mobile link budget assumptions for total error in the power correction algorithm due to the open loop and closed loop is lognormal distributed with zero mean and 1 dB standard deviation. For the static terminal, this assumption is relaxed to 0.5 dB standard deviation.

Open Loop Power Control: The following describes an open loop power control technique for the invention embodied in a Land Mobile Terminal This technique can be readily programmed to yield the desired outcomes.

The $k^{th}$ complex baseband sample of the received forward link sampled signal $r_f$ is modeled as:

$$r_f[k]=\alpha_f[k]A_f x_f[k]+n_c[k]+jn_s[k] \qquad (1)$$

where $\alpha_f$ is a channel fading coefficient (Rician fast fading random process and Lognormal slow fading random process), $A_f$ is the nominal forward link receive signal amplitude, $x_f$ is the complex baseband modulated signal, and $n_c$ and $n_s$ are the in-phase (cosine) and quadrature (sine) components of the AWGN (zero mean, variance $\sigma^2$).

The $k^{th}$ complex baseband sample of the received return link sampled signal $r_r$ is modeled as $$r_r[k]=\alpha_r[k]A_r x_r[k]+n_c[k]+jn_s[k]+MAI \qquad (2)$$

where $\alpha_r$ is a channel fading coefficient (Rician fast fading random process and Lognormal slow fading random process), $A_r$ is the nominal return link receive signal amplitude, $x_r$ is the complex baseband modulated signal, and $n_c$ and $n_s$ are the in-phase (cosine) and quadrature (sine) components of the AWGN (zero mean, variance $\sigma^2$).

The return link open loop amplitude fade estimate, $\hat{\Delta}$, is an estimate obtained from monitoring the forward link. The return link open power control correction, $C_o$, is obtained as $$C_o = \left(\frac{1}{\hat{\Delta}}\right)^2 \qquad (2b)$$

The following assumptions are made:
$\alpha_f$ and $\alpha_r$ are independent in the fast fading (Rician) sense but highly correlated in the slow fading (Lognormal) sense. $E\lfloor|\alpha_f^2|\rfloor=E\lfloor|\alpha_r^2|\rfloor=E[|\alpha^2|]$.
The modulated waveforms $x_f$ and $x_r$ are constant envelope
The de-correlation time of the slow fading is greater than the time it takes the terminal to travel ~2 meters. $E\lfloor|\alpha^2|\rfloor=\Delta^2$.

(Measurements of the land mobile satellite channel at S band have confirmed these assumptions. See for instance—Fontan & Vazquez, "S-Band LMS propagation channel behaviour for different environments, degrees of shadowing and elevation angles", *IEEE Transactions on Broadcasting*, March 1998.)

Based on these assumptions, the terminal can examine the average power over a distance traveled of approximately 2 meters and pre-correct for the lognormal error. The pre-corrected signal received by the hub will experience Rician fading, as well as whatever error is present in the pre-correction process. This error is assumed to be log-normally distributed. It is desired to determine the mean and variance of the estimation error.

The received power on the forward link, P, is defined as $$P[k]=|r_f^2[k]| \qquad (3)$$

P is used to evaluate $\hat{\Delta}$, so determine the mean and variance of P. However, this approach has bias problems. It would be better to directly estimate the amplitude or $E_b/N_0$.

Analysis of a single sample: An analysis of a sample is useful to an understanding of the invention. First, determine the mean and variance of the estimator using only a single sample of P.

$$E[P[k]]=E[|r_f^2[k]|]=E\lfloor|(\alpha_f[k]A_f x_f[k]+n_c[k]+jn_s[k])^2|\rfloor. \qquad (4)$$

Simplifying notation results only in $$= E\lfloor|(\alpha Ax + n_c + jn_s)^2|\rfloor. \qquad (5)$$

Expanding and dropping terms that are zero:

$$= E[\alpha^2 A^2 x^2 + n_c^2 + n_s^2] \qquad (6)$$

$$= A^2 \Delta^2 + 2\sigma^2. \qquad (7)$$

The $x^2$ term has vanished due to the assumption that a constant envelope exists. Reorganizing terms results in:

$$E[P[k]] = A^2 \left( \Delta^2 + \frac{2\sigma^2}{A^2} \right). \qquad (8)$$

Comparing this estimate to the nominal transmission (considered the last transmission with a closed loop update), one can determine $\hat{\Delta}$.

$$E[\hat{\Delta}] = \sqrt{\frac{A^2\left(\Delta^2 + \frac{2\sigma^2}{A^2}\right)}{A^2\left(1 + \frac{2\sigma^2}{A^2}\right)}} = \sqrt{\frac{\left(\Delta^2 + \frac{2\sigma^2}{A^2}\right)}{\left(1 + \frac{2\sigma^2}{A^2}\right)}}. \qquad (9)$$

The estimate $\hat{\Delta}$ is biased, but the bias is small for high signal-to-noise ratio.

The $2^{nd}$ moment of P is (with some interim calculation steps omitted):

$$E[P[k]P^*[k]] = E[rr^*r^*r] = E[[(\alpha Ax + n_c + jn_s)(\alpha Ax + n_c + jn_s)^*]^2]. \qquad (10)$$

$$= A^4 E[\alpha^4] + 6A^2 E[\alpha^2 x^2 n_c^2] + \qquad (11)$$
$$2A^2 E[\alpha^2 x^2 n_s^2] + E[n_c^4] + E[n_s^4] + 2E[n_c^2 n_s^2].$$

$$= A^4 \sqrt{\frac{8 + 16K + 4K^2}{(2K+1)^2}} + 8A^2\Delta^2\sigma^2 + 8\sigma^4 \qquad (12)$$

where K is the Rician K factor.

The variance of P is then $$\text{var}[P[k]] = E[P[k]P^*[k]] - E[P[k]]^2. \qquad (13)$$

$$= A^4 \sqrt{\frac{8 + 16K + 4K^2}{(2K+1)^2}} + 8A^2\Delta^2\sigma^2 + 8\sigma^4 - (\Delta^2 A^2 + 2\sigma^2)^2. \qquad (14)$$

$$= A^4 \sqrt{\frac{8 + 16K + 4K^2}{(2K+1)^2}} + 4A^2\Delta^2\sigma^2 + 4\sigma^4 - A^4\Delta^2. \qquad (15)$$

Figure 4:
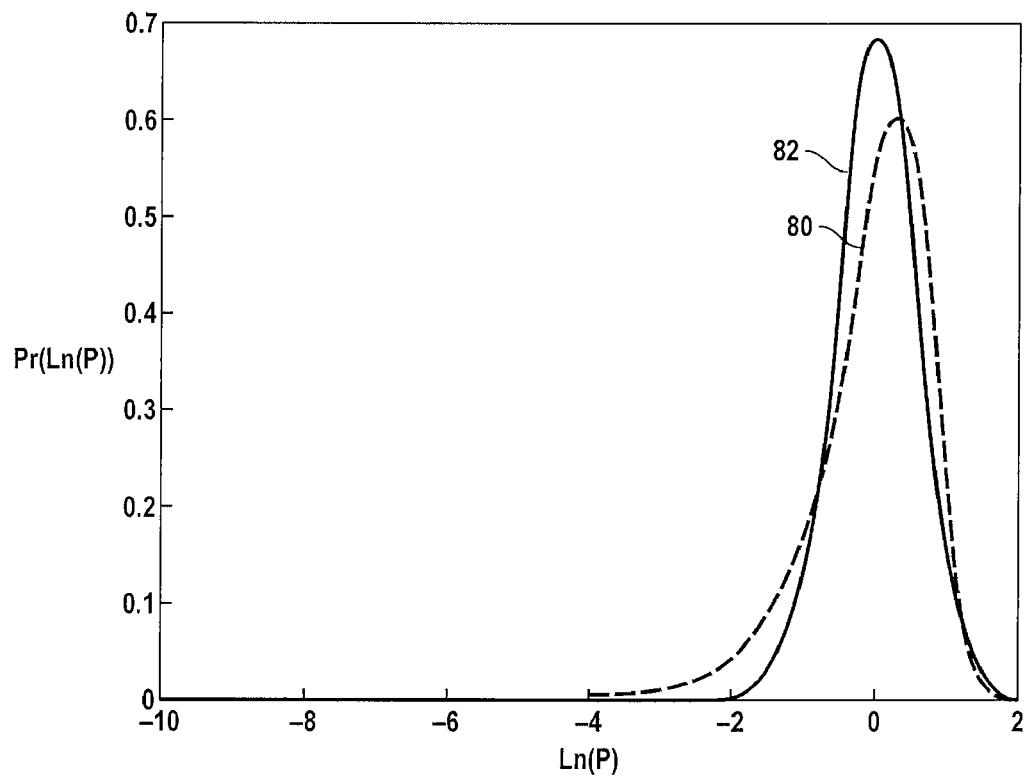
FIG. 4 is a graph showing a comparison of probability distribution functions (PDFs) for Monte-Carlo simulation and lognormal approximation.

Monte-Carlo simulation ("measured data 80") generally agrees with the analytic results 82 above and confirms that the open loop error is roughly log normally distributed, as shown in FIG. 4, which is a graph showing a comparison of probability distribution functions (PDFs) for Monte-Carlo simulation as measured data 80 and the corresponding lognormal approximation 82, where the Rician K=15 dB, C/N$_0$=58 dB, and the sample rate is 166 kHz).

Analysis of a block of samples: The variance between the measured data and the analytic result can be reduced by averaging over a block of N samples.

$$P_{avg} = \frac{1}{N} \sum_{k=k_0}^{k_0+N-1} P[k] \qquad (16)$$

Figure 5:
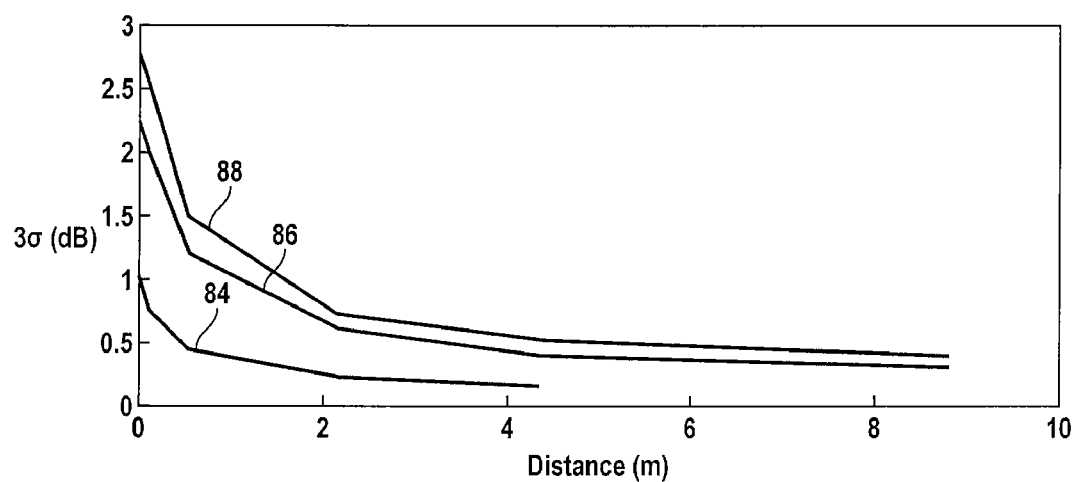
FIG. 5 is a graph illustrating open loop power estimate vs. distance of a terminal in motion at 80 km/h

For a sample rate of 166 kHz and a terminal velocity of 80 km/h, N=16384 is about 2.1 m. The reduction in variance is shown in FIG. 5 for three different C/N$_0$ values: 48, dB (84), 58 dB (86) and 68 dB (88).

Figure 6:
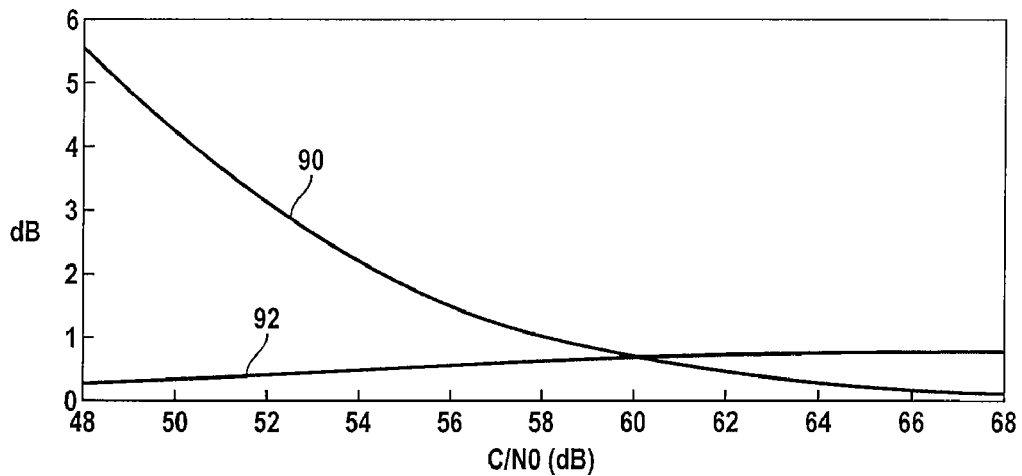
FIG. 6 is a graph illustrating open loop power estimate vs. $C/N_0$ showing a decrease in variance with increasing signal to noise ratio.

The statistics are heavily affected by the C/N$_0$, as shown in FIG. 6, which shows the mean 90 and variance 92 of the open loop power estimate in dB vs. C/N$_0$ in dB with block averaging statistics for N=16384. While the variance decreases with decreasing C/N$_0$ (a surprising result), the overall error (including mean error) increases as expected with decreasing C/N$_0$. Exact analytic expressions for the mean and variance of average power $P_{avg}$ have not been determined. Approximations based on statistics are suitable.

Figure 7:
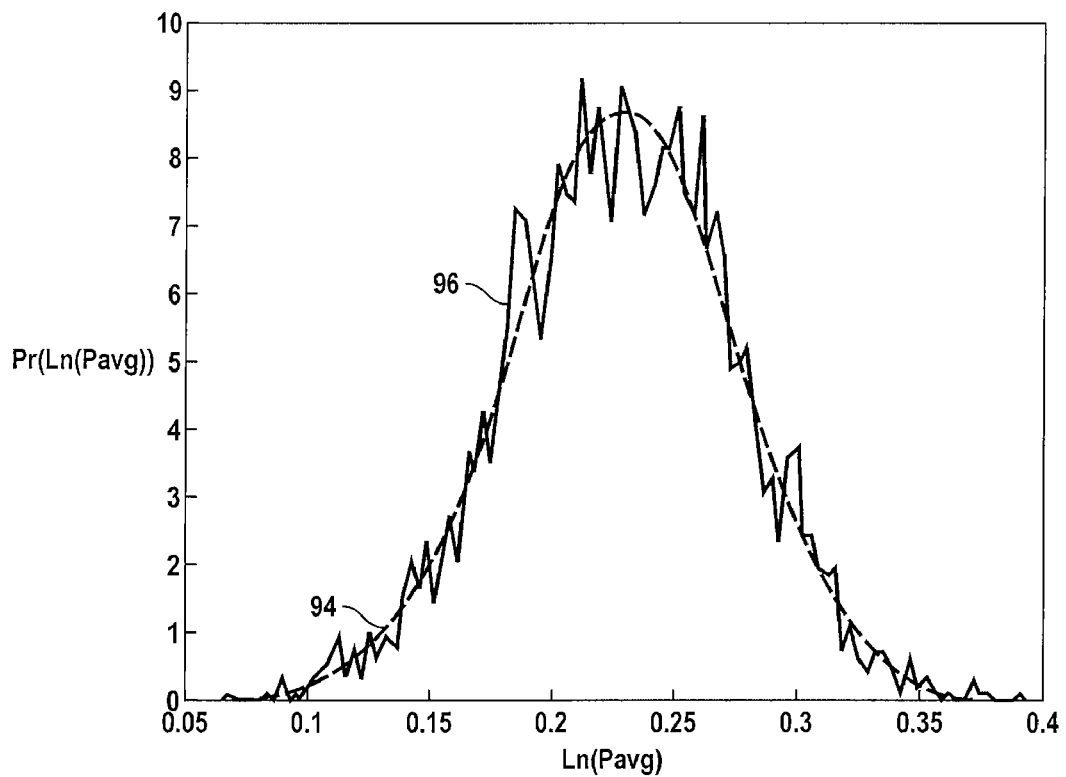
FIG. 7 is a graph comparing PDFs for Monte-Carlo simulation (block avg) and lognormal approximation with measured data.

A look at the PDF of the block averaged Monte Carlo simulation power errors (FIG. 7) again shows a lognormal distribution is an appropriate choice. Note how closely the lognormal theoretical curve 94 approximation matches the measured data 96 of a Monte Carlo simulation.

SNR Estimation: There is a large bias associated with power estimation at the expected C/N$_0$ operating range. Instead of estimating change in received power, an estimated change in received SNR can be used. In this case, the return link open loop amplitude fade estimate, $\hat{\Delta}$, is given by $$\hat{\Delta} = \sqrt{\frac{SNR_{estimate}}{SNR_{nominal}}} \qquad (16b)$$

where $SNR_{estimate}$ is the estimate of the SNR, and $SNR_{nominal}$ is the nominal SNR corresponding to $\alpha$=1.

There are a variety of data-aided (DA) and non-data-aided (NDA) techniques available for performing SNR estimation. Non-data-aided techniques are desirable, because they do not require phase tracking in the fast fading Rician environment. Two such NDA techniques have been investigated in Rician fading. These estimates are derived based on higher order statistics of a Gaussian random variable, but they appear to work effectively for a Rician channel as well.

The M2M4 estimator is:

$$M_2 = E[r[k]r[k]^*] \qquad (17)$$

$$M_4 = E[(r[k]r[k]^*)^2] \qquad (18)$$

$$SNR_{M_2M_4} = \frac{\sqrt{2M_2^2 - M_4}}{M_2 - \sqrt{2M_2^2 - M_4}} \qquad (19)$$

The SVR estimator is:

$$\beta = \frac{E[r[k]r[k]^*r[k-1]r[k-1]^*]}{E[(r[k]r[k]^*)^2] - E[r[k]r[k]^*r[k-1]r[k-1]^*]} \qquad (20)$$

$$SNR_{SVR} = \beta - 1 + \sqrt{\beta(\beta-1)} \qquad (21)$$

In implementation, the expectations in the above equations are based on time series averages. For this simulation, the time series averages were performed over 16384 symbols (roughly the time it takes the terminal to move 2.1 m at 80 km/hr).

Figure 8:
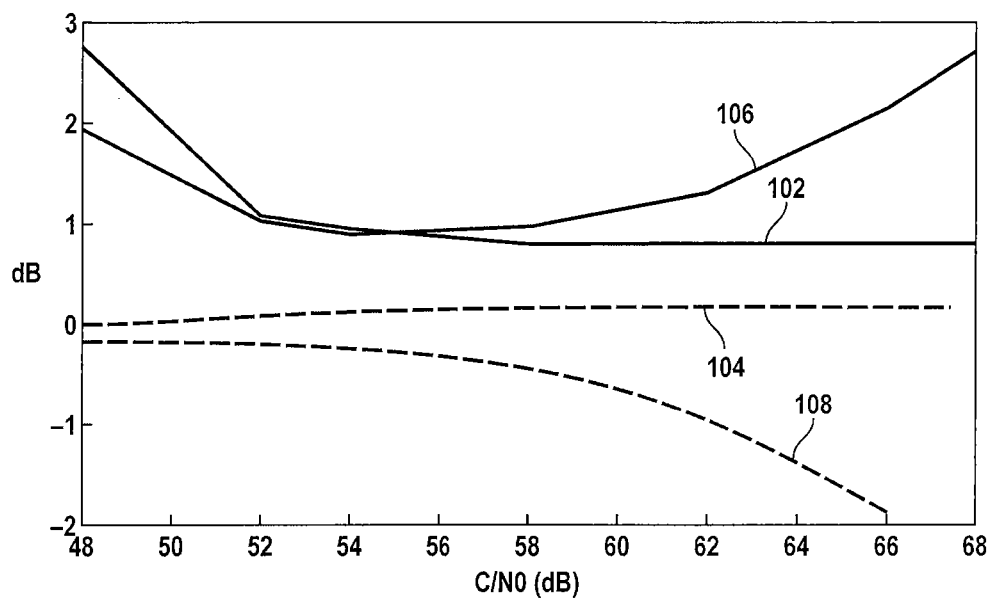
FIG. 8 is a graph illustrating signal to noise ratio (SNR) Estimation Performance for N=16384.

FIG. 8 shows the performance for the M2M4 and SVR SNR estimates for a Rician K=15 dB channel over a +/−10 dB range of average C/N$_0$ operating points. The SVR technique represented by curve 102 performs significantly better than the M2M4 technique represented by curve 106 at moderate and high average SNR, while also experiencing very small bias (curve 104) over the entire range as compared to M2M4 bias (curve 108).

Closed Loop Power Control: The closed loop portion 34 (FIG. 1) of the power controller 35 is embodied in a technique that is based on measurements of the terminal's received de-spread amplitude in comparison to that of a "leader" terminal (not shown).

A link-level acknowledgement protocol is used on the forward link 22. If a return link burst is received by the hub (not shown) of the system and decoded error free, an acknowledgement (ACK) is transmitted to the terminal 12. The acknowledgement contains a power correction. Because the target frame error rate (at system capacity in the Rician channel) is ~25%, there is a mild inherent negative bias in the power control algorithm. Therefore, if the terminal does not receive an acknowledgement it automatically applies a positive power correction, as in FIGS. 15 and 16.

A Monte Carlo simulation has been used to determine if the closed loop power control error is roughly lognormal, what the power control statistics are, and what the appropriate no-acknowledge power correction should be. The Monte Carlo simulation description is as follows:

1. The terminal transmits a burst with per bit energy $E_b$. The simulation is initialized with $E_b$ equal to the $E_{b,target}$ (the terminal has just logged in).
2. The burst amplitude is attenuated by a Rician fading coefficient $\alpha$. (This assumes that fade is constant over the duration of the terminal's burst. For high velocity terminals, this assumption does not hold and thus results are inaccurate and pessimistic.)
3. Multiple access interference is modeled by an measuring the power of other transmitting terminals that overlap this terminal's burst. The other terminals have an exponential arrival time, and N of them have some fraction of their burst overlap the burst of interest. The k$^{th}$ terminal overlaps the burst of interest by fraction $\tau_k$, transmits $E_{b,target}$ per bit energy with a 1 dB standard deviation lognormal power error $p_k$, and has its burst amplitude attenuated by a Rician fading coefficient $\alpha_k$. There are K symbols per information bit, and the spreading efficiency of the GMSK waveform is $\beta$. The SINR is given by:

$$\frac{E_b}{N_0 + I_0} = \frac{\alpha^2 E_b}{N_0 + \frac{1}{\beta K_{spread}} \sum_{k=1}^{N} \alpha_k^2 p_k \tau_k E_{b,target}} \quad (22)$$

Figure 9:
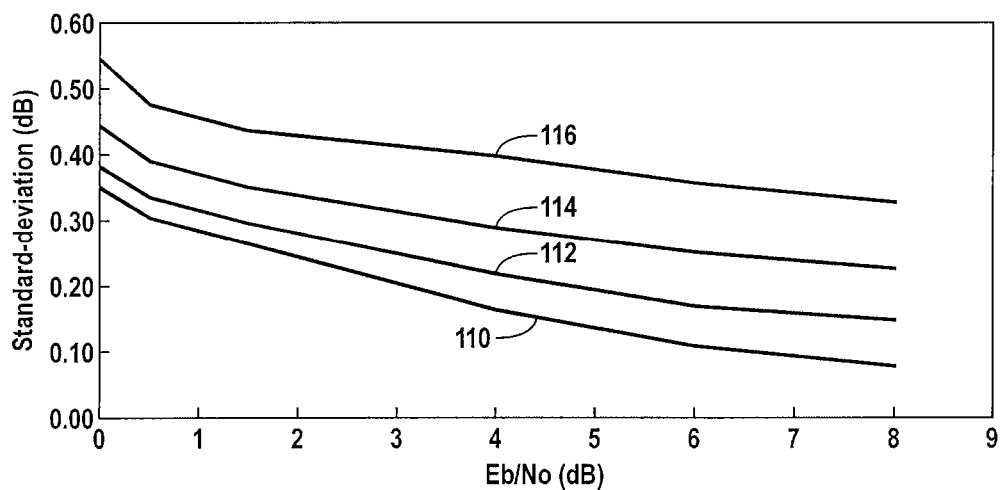
FIG. 9 is a graph illustrating amplitude and SINR performance estimates.

4. The probability that the burst of interest is successfully decoded by the hub is based on an 848-bit block FER curve. The decode probability threshold is based on the SINR. A uniform random number is chosen, and if it exceeds the threshold the burst is successfully decoded.
5. The terminal's transmit amplitude (including Rician fading coefficient) is estimated. There is a lognormal distribution to the amplitude estimation error, shown by the curves 110, 112, 114, 116 for no fading, and K=14.8, 10.2 and 7.0, respectively, in FIG. 9. The SINR (not SNR) is used to pick the appropriate sigma. The amplitude estimation error is $\epsilon$.
6. The power correction (for successful decoding) in dB is determined by $$C_{c,dB} = PC_{ack} = 0.25[\log_{10}(E_{b,target}) - 10\log_{10}(\alpha^2 E_b \epsilon)] \quad (23)$$

7. The power correction at the terminal is applied by $$E_b \leftarrow E_b 10^{\log_{10}[(1-ack)PC_{noack} + ack \cdot PC_{ack}]} \quad (24)$$

Figure 10:
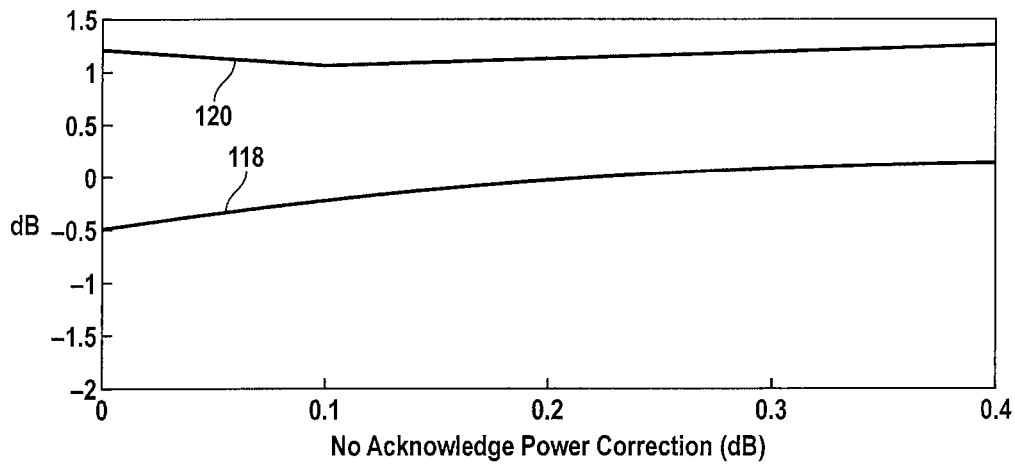
FIG. 10 is a graph illustrating the closed loop power control performance estimates.

The closed loop power control performance, that is Eb bias 118 and variance 120, is shown in FIG. 10. The performance is shown for Rician K=15 dB, average terminal arrival rate 25.6/burst time, acknowledgement loop gain of 0.25 dB, log-normal power control error=1 dB sigma, target Eb/N$_0$ of 9.6 dB, and spread factor 66 with GMSK BT=0.5. These studies demonstrate that a combined open-loop/closed-loop power control technique is a workable solution in the intended environment.

The invention has been explained with reference to specific embodiments and examples. Other embodiments will be evident to those of skill in the art. It is therefore not intended that the invention be limited, except as indicated by the appended claims.

What is claimed is:

1. In a satellite communications network, wherein a power controlling hub terminal and a plurality of user terminals communicate through a communications relay satellite, a method of power control for a transmitter of a user terminal comprising:

transmitting along a forward link from the hub terminal via the satellite to generate a forward link receive signal at the user terminal, the forward link receive signal experiencing forward link fading; thereafter transmitting along a return link from the user terminal via the satellite to generate a return link receive signal at the hub terminal, the return link receive signal experiencing return link fading;

estimating the return link fading by monitoring the forward link receive signal at the user terminal;

using a speed estimation during movement of the user terminal over a preselected distance to examine the forward link receive signal to correct for errors in estimation processes and to generate an open loop power correction value;

transmitting an acknowledgement message over the forward link from the hub terminal to the user terminal; thereupon monitoring at the user terminal for whether or not the acknowledgement message has been received at the user terminal; and a) if the acknowledgement is received, updating a closed loop power correction at the user terminal with a received closed loop power correction value contained in the acknowledgement message; and b) if the acknowledgement message is not received, incrementing a closed loop power correction at the user terminal; thereupon adding the open loop power correction to the received closed loop power correction or the incremented closed loop power correction to yield a total power correction at the user terminal; and using the total power correction to adjust power level of the return link signal from the user terminal to the hub terminal.

2. The method according to claim 1 wherein the speed estimation is used to determine how long the forward link receive signal is to be observed.

3. The method according to claim 1 wherein the forward link receive signal is observed for a predetermined time period.

4. The method according to claim 1 further including estimating return link signal-to-noise ratio $E_b/N_0$ by introducing periodic return link transmission outages during which no terminals are transmitting on the return link.

5. The method according to claim 1 wherein return link open loop power correction, $C_o$, is obtained as $$C_o = \left(\frac{1}{\hat{\Delta}}\right)^2$$

where $\hat{\Delta}$ is the return link open loop amplitude fade estimate obtained from monitoring the forward link given by the ratio:

$$\hat{\Delta} = \sqrt{\frac{SNR_{estimate}}{SNR_{nominal}}}$$

where $SNR_{estimate}$ is the estimate of the SNR, and $SNR_{nominal}$ is the nominal SNR corresponding to $\alpha=1$.

6. The method according to claim 1 further including the step of causing periods of outage of transmission on the return link in order to allow observations of noise levels in the return link.

7. A system for controlling signal power output of a transmitter of a user terminal in a satellite communications network having a power controlling hub terminal and a plurality of user terminals communicating through a communications relay satellite, the system comprising:

a hub transmitter in the hub terminal for transmitting along a forward link from the hub terminal via the satellite to generate a forward link receive signal at the user terminal, the forward link receive signal experiencing forward link fading;

a user terminal transmitter in the user terminal for transmitting along a return link from the user terminal via the satellite to generate a return link receive signal at the hub terminal, the return link receive signal experiencing return link fading;

a receiver in the user terminal for estimating the return link fading by monitoring the forward link receive signal at the user terminal;

a control system in the user terminal for using a speed estimation during movement of the user terminal over a preselected distance to examine the forward link receive signal to correct for errors in estimation processes and to generate an open loop power correction value;

a controller in the hub terminal for transmitting an acknowledgement message over the forward link from the hub terminal to the user terminal;

a subsystem in the receiver in the user terminal for monitoring at the user terminal whether or not the acknowledgement message has been received at the user terminal; and a) if the acknowledgement is received, for updating a closed loop power correction with a received closed loop power correction contained in the acknowledgement message; and b) if the acknowledgement message is not received, for incrementing a closed loop power correction at the user terminal;

a subsystem in the user terminal for adding the open loop power correction to the received closed loop power correction or the incremented closed loop power correction to yield a total power correction at the user terminal; and a subsystem in the user terminal for using the total power correction to adjust power level of the return link signal from the user terminal to the hub terminal.

* * * * *